F. L. SPRING.
SPRING SHOCK ABSORBER.
APPLICATION FILED APR. 19, 1918.
1,328,601. Patented Jan. 20, 1920.
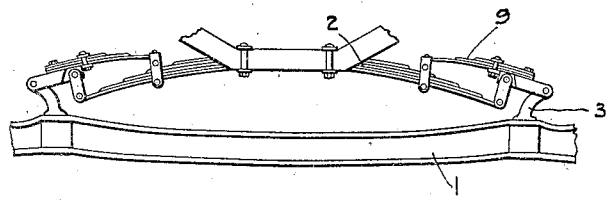
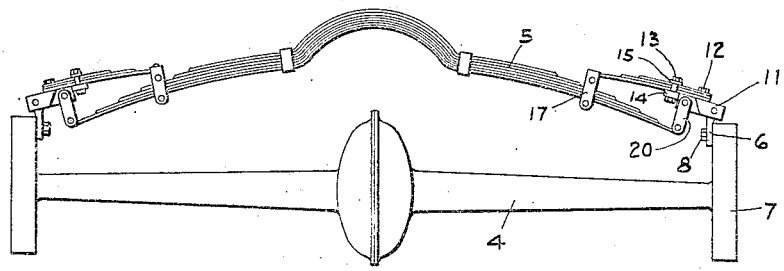
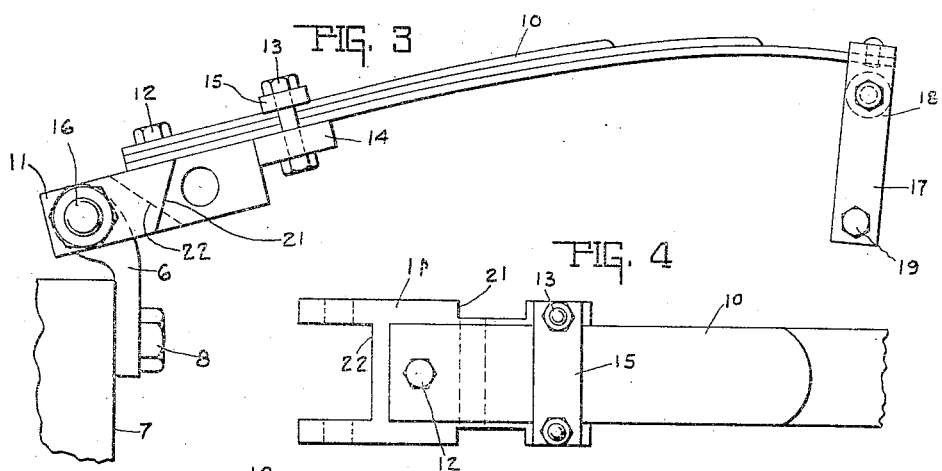
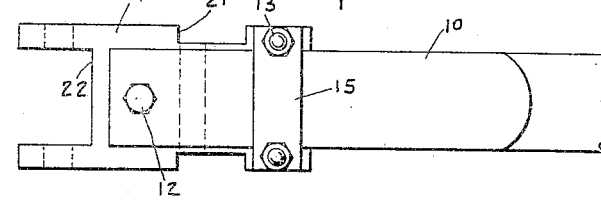
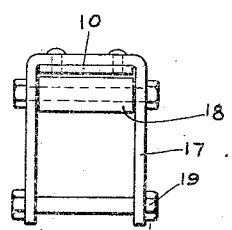
INVENTOR
FREDERICK L. SPRING.
BY
Lockwood & Lockwood
ATTORNEYS.

UNITED STATES PATENT OFFICE.

FREDERICK L. SPRING, OF INDIANAPOLIS, INDIANA.

SPRING SHOCK-ABSORBER.

1,328,601.  Specification of Letters Patent.  Patented Jan. 20, 1920.

Application filed April 19, 1918. Serial No. 229,487.

*To all whom it may concern:*

Be it known that I, FREDERICK L. SPRING, a citizen of the United States, and a resident of Indianapolis, county of Marion, and State of Indiana, have invented a certain new and useful Spring Shock-Absorber; and I do hereby declare that the following is a full, clear, and exact description thereof, reference being had to the accompanying drawings, in which like numerals refer to like parts.

This invention relates to shock absorbers and is particularly designed for use in connection with Ford cars, but it will be readily understood that it can be used with other makes of cars as well.

The prime feature of the invention is the provision of shock absorbing springs which coöperate with the main springs of the vehicle to increase the resilient effect of the body springs and at the same time absorb any shock directed against the wheels of the vehicle and assimilate the same before it reaches the body of the vehicle.

A further feature of the invention is the means of attaching the shock absorbing springs to the body springs and parts of the running gear of the vehicle.

The full nature of the invention will be understood from the accompanying drawings and the following description and claim:—

Figure 1 is an elevation of the front axle of a Ford machine, showing the shock absorbing springs attached thereto. Fig. 2 is a similar view of the rear axle of the machine. Fig. 3 is an enlarged edge elevation of one of the rear shock absorbing springs and a portion of the body spring. Fig. 4 is a detail top plan view thereof and Fig. 5 is an end elevation showing the manner of attaching the shock absorbing spring to the body spring, the latter being shown in cross section.

Referring to the drawings in which similar reference numerals designate corresponding parts throughout the several views, 1 indicates the front axle of an automobile, and is herein shown of the Ford type, and 2 indicates the front spring coöperating therewith, the usual form of bracket 3 being attached to the front axle, but in this instance reversed from the position in which the brackets are ordinarily positioned so that the curvature thereof will extend outwardly instead of inwardly. The rear axle 4 and the rear body spring 5 are of the ordinary construction, but in this instance a modified form of bracket 6 is attached to each brake drum 7 and replaces the ordinary bracket used for supporting the body spring, said brackets being attached to the brake drum 7 by means of screw bolts 8.

Pivotally attached to the upper ends of the brackets 3 and 6 are shock absorbing springs 9 which are preferably formed of layers of leaves 10, said leaves varying in length similar to the ordinary leaf spring, one end of the leaves being attached to a shackle block 11 by means of bolts 12 and 13, the bolt 12 passing through the overlapping ends of the spring leaves, while the bolts 13 extend through ears 14 on the shackle blocks which are at one end of the shackle blocks and below the springs, while the opposite ends pass through a strap 15 above the spring, there being two bolts 13, one at each edge of the spring.

The outer ends of the shackle blocks are bifurcated and straddle the brackets 3 and 6 and are pivotally attached thereto by means of bolts 16 or otherwise. In attaching the shock absorbing springs to the body springs, the ends of the body springs are introduced through clips 17 which are fixed to the inner ends of the shock absorbing springs 9, each clip having a bearing roller 18 at the point adjacent its connection with the shock absorbing spring, which roller rests and rides upon the body spring, the clips being held against casual disengagement from the body spring by extending rods 19 through the lower ends of the clips and below and free from the body springs. The ends of the body springs are then attached to the shackle blocks 11 through the medium of the ordinary links 20 employed for suspending the body springs from the brackets, one end of the links being pivoted to the body springs, as is usual, while the opposite ends thereof are pivotally attached to the shackle blocks 11, said shackle blocks having shoulders 21 for limiting the outward swinging movement of the links and thereby limiting the end thrust of the body springs.

The shackle blocks 11 are likewise provided with inclined faces 22 between the bifurcated ends thereof which likewise limit the downward swinging movement of the shackle blocks.

By providing this form of device more or less resiliency is provided and by suspending the ends of the body springs from the shackle blocks and pivoting one end of the shackle blocks to the axles of the vehicle and resting the inner ends of the shock absorbing spring upon the body springs, any jar or shock imparted to the wheels of the vehicle will be absorbed before it is imparted to the body springs.

It will likewise be seen that in view of the simplicity of the structure of the device it can be produced at a nominal expense.

The invention claimed is:—

The combination with the axles of a vehicle, brackets carried thereby, and body springs, of shackle blocks having bifurcated ends for engagement with said brackets, shock absorbing springs, comprising a plurality of leaves, ears on said shackle blocks, straps extending over said shock absorbing springs in alinement with said ears, bolts extending through said ears, and the ends of the straps and at the edges of said shock absorbing springs, links pivotally connecting the ends of the body springs and the shackle blocks, shoulders for limiting the swinging movement of said links, and means to hold the inner ends of the shock absorbing springs in alinement with the body springs.

In witness whereof, I have hereunto affixed my signature.

FREDERICK L. SPRING.